United States Patent
Kloper et al.

(10) Patent No.: US 10,367,550 B2
(45) Date of Patent: Jul. 30, 2019

(54) UPDATING PRECODING MATRIX FOR MIMO TRANSMISSIONS

(71) Applicant: Cisco Technology, Inc., San Jose, CA (US)

(72) Inventors: David S. Kloper, Santa Clara, CA (US); Mithat C. Dogan, San Jose, CA (US); Matthew A. Silverman, Shaker Heights, OH (US); Brian D. Hart, Sunnyvale, CA (US); Jiunming Huang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/477,620

(22) Filed: Apr. 3, 2017

(65) Prior Publication Data

US 2018/0287674 A1 Oct. 4, 2018

(51) Int. Cl.
  *H04B 7/0426* (2017.01)
  *H04B 7/0452* (2017.01)
(52) U.S. Cl.
  CPC ......... *H04B 7/0452* (2013.01); *H04B 7/0426* (2013.01)
(58) Field of Classification Search
  CPC combination set(s) only.
  See application file for complete search history.

(56) References Cited

U.S. PATENT DOCUMENTS

| | | | |
|---|---|---|---|
| 8,059,733 B2 | 11/2011 | Khojastepour et al. | |
| 8,670,390 B2 | 3/2014 | Shattil | |
| 2010/0232537 A1* | 9/2010 | Park | H04B 7/0619 375/267 |
| 2011/0003608 A1* | 1/2011 | Forenza | H04B 7/01 455/501 |
| 2013/0100994 A1* | 4/2013 | Merlin | H04L 1/0003 375/219 |
| 2013/0188567 A1 | 7/2013 | Wang et al. | |
| 2017/0093950 A1* | 3/2017 | Trani | H04L 65/608 |

* cited by examiner

*Primary Examiner* — Wednel Cadeau
(74) *Attorney, Agent, or Firm* — Patterson + Sheridan, LLP

(57) ABSTRACT

The present disclosure discloses that a device uses precoding to transmit independent data streams to existing users and additional independent data streams to one or more new users simultaneously. During a first transmission of a first one or more data streams that are precoded using a first precoding matrix, the device determines to transmit a second one or more data streams in a second transmission. Before the first transmission is complete, the device calculates a combined precoding matrix for precoding the first one or more data streams and the second one or more data streams. The device transmits the first one or more data streams in the first transmission and the second one or more data streams in the second transmission simultaneously using the combined precoding matrix.

20 Claims, 8 Drawing Sheets

UPDATING PRECODING MATRIX FOR MIMO TRANSMISSIONS

BACKGROUND

In a Wi-Fi network, a transmitter such as an access point (AP) can use multi-user multiple-input and multiple-output (MU-MIMO) technologies to transmit independent data streams to multiple user devices at the same time. The transmitter can use precoding technologies to precode the independent data streams to improve the receiving performance of the user devices.

SUMMARY

One embodiment of the present disclosure provides a device. The device includes a processor and a memory. The memory contains a program that, when executed on the processor, performs an operation. The operation includes, during a first transmission of a first one or more data streams that are precoded using a first precoding matrix, determining to transmit a second one or more data streams in a second transmission. The operation also includes calculating, before the first transmission is complete, a combined precoding matrix for precoding the first one or more data streams and the second one or more data streams. The operation further includes transmitting the first one or more data streams in the first transmission and the second one or more data streams in the second transmission simultaneously by applying the combined precoding matrix.

One embodiment of the present disclosure provides a computer program product that includes a non-transitory computer-readable storage medium having computer readable program code embodied therewith. During a first transmission of a first one or more data streams that are precoded using a first precoding matrix, the computer readable program code determines to transmit a second one or more data streams in a second transmission. The computer readable program code also calculates, before the first transmission is complete, a combined precoding matrix for precoding the first one or more data streams and the second one or more data streams. The computer readable program code further transmits the first one or more data streams in the first transmission and the second one or more data streams in the second transmission simultaneously by applying the combined precoding matrix.

One embodiment of the present disclosure provides a method. The method includes during a first transmission of a first one or more data streams that are precoded using a first precoding matrix, determining to transmit a second one or more data streams in a second transmission. The method also includes calculating, before the first transmission is complete, a combined precoding matrix for precoding the first one or more data streams and the second one or more data streams. The method further includes transmitting the first one or more data streams in the first transmission and the second one or more data streams in the second transmission simultaneously by applying the combined precoding matrix.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In a Wi-Fi network, a transmitter such as an AP can use MU-MIMO technologies to transmit independent data streams to multiple different user devices at the same time. For example, an AP with M transmit antennas can transmit P independent data streams to multiple user devices. A fairly common restriction is that P≤M. The user devices can have one or more receiving antennas. In order to improve the receiving performance of the user devices, the AP can use a precoding matrix to precode the P independent data streams.

In some scenarios, during the transmission of the P independent data streams, the AP determines to transmit Q additional independent data streams to one or more new user devices. In order to transmit the Q additional independent data streams, in one embodiment the AP interrupts the ongoing transmission of the P independent data streams and transmits the Q additional independent data streams. In another embodiment, the AP transmits the Q additional independent data streams after the P independent data streams are transmitted. One drawback of these embodiments is that the AP does not transmit the P independent data streams and the Q additional independent data streams simultaneously which would achieve higher throughput. The present disclosure provides embodiments for transmitting the P independent data streams to the existing user devices and the Q additional independent data streams to the one or more new user devices simultaneously without affecting the receiving performance of the existing user devices.

Figure 1:
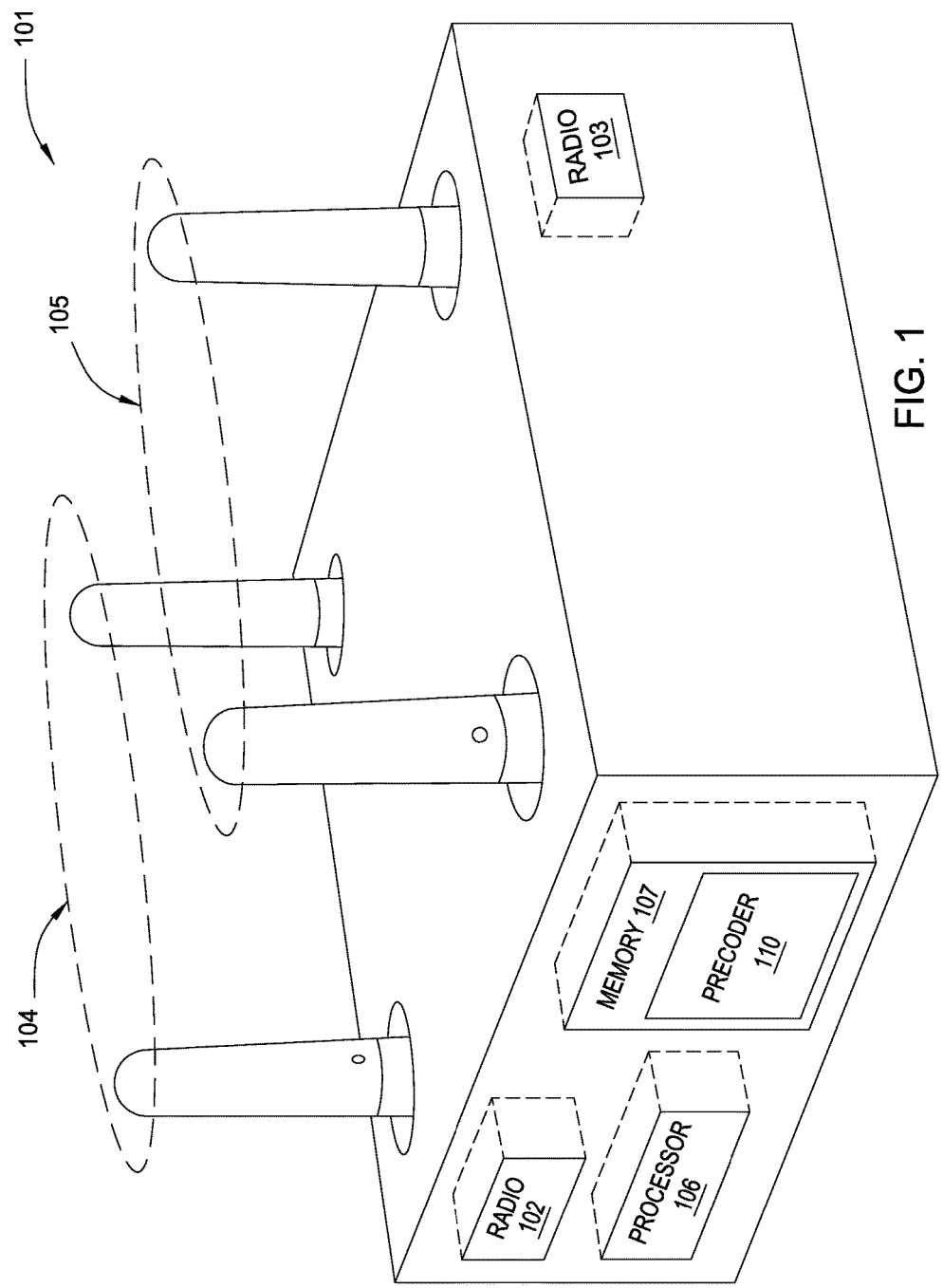
FIG. 1 illustrates an MIMO AP, according to one embodiment herein.

FIG. 1 illustrates an AP 101, according to one embodiment herein. In one embodiment, the AP 101 includes multiple radios such as a first radio 102 and a second radio 103 as shown in FIG. 1. The radio 102 transmits and receives signals through one or more antennas 104 (e.g., two antennas as shown in FIG. 1), and the radio 103 transmits and receives signals through one or more antennas 105 (e.g., two antennas as shown in FIG. 1). That is, the AP is an MIMO AP.

The AP 101 also includes a processor 106 and a memory 107. The processor 106 may be any computer processor capable of performing the functions described herein. Although memory 107 is shown as a single entity, memory 107 may include one or more memory devices having blocks of memory associated with physical addresses, such as random access memory (RAM), read only memory (ROM), flash memory or other types of volatile and/or non-volatile memory.

The memory 107 includes a precoder 110 which precodes independent data streams before the independent data streams are transmitted to user devices through the antennas. In one embodiment, the precoder 110 precodes independent data streams by calculating a precoding matrix and applying the precoding matrix to the independent data streams. In the present disclosure, the precoder 110 can calculate a precoding matrix and use that matrix to simultaneously transmit independent data streams to existing user devices and to one or more new user devices. In one embodiment, the precoder 110 can be software. In other embodiments, the precoder 110 can be hardware, firmware or combinations of software and hardware. For example, the precoder 110 may include hardware components on the processor 106. In another example, the precoder 110 can be a special hardware separate from the processor 106.

FIG. 1 is only one embodiment of the AP 101. In another embodiment, the AP 101 may include only one radio that transmits and receives signals through multiple antennas.

Figure 2:
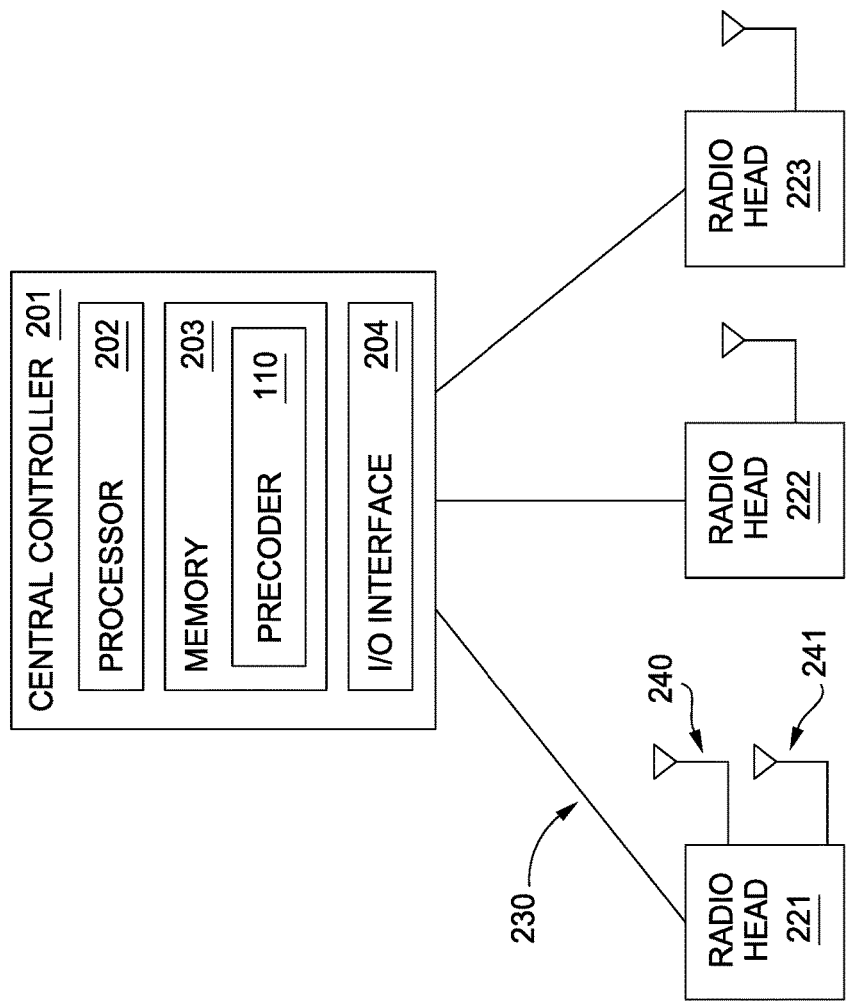
FIG. 2 illustrates a central controller controlling multiple radio heads, according to one embodiment herein.

In another embodiment, the precoder 110 can be used in a central controller that controls multiple radio heads (RHs). FIG. 2 illustrates a central controller 201 controlling multiple RHs, according to one embodiment herein. As shown in FIG. 2, the central controller 201 includes a processor 202, a memory 203 and an I/O interface 204. The processor 202 and the memory 203 may be similar as the processor 106 and the memory 107 in FIG. 1 respectively.

The central controller 201 controls multiple RHs such as RHs 221, 222 and 223 as shown in FIG. 2. In one embodiment, the RHs are connected to the central controller 201 through wired connections 230, e.g., Ethernet cables. In one embodiment, the RHs communicate information with the central controller 201 through the I/O interface 204. In one embodiment, the central controller 201 is located in a chassis and the RHs are distributed at different geographic locations in an area, e.g., a building.

Each of the RHs includes one or more antennas to transmit and receive signals. For example, as shown in FIG. 2, the RH 221 includes two antennas 240 and 241. The RHs 222 and 223 each include one antenna.

In one embodiment, functions of an AP are split into two parts. The central controller 201 provides the digital part of the physical (PHY) layer function for baseband processing (e.g., precoding) and the media access control (MAC) layer function (e.g., collision avoidance) of an AP. Each RH provides the analog part of the PHY layer function for transmitting and receiving radio frequency (RF) signals in a frequency band, plus associated digital signal processing (e.g., up-sampling and Q-to-I calibration).

As shown in FIG. 2, the memory 203 includes the precoder 110. Similarly as explained above, the precoder 110 precodes independent data streams before the independent data streams are transmitted to user devices through the RHs. In one embodiment, the central controller 201 calculates a precoding matrix and applies the precoding matrix to the baseband signals of the independent data streams. The central controller 201 sends the baseband signals of the precoded independent data streams to the RHs through the wired connections 230. The RHs transmit the precoded independent data streams as RF signals to the user devices through the antennas of the RHs. Similarly as above, the precoder 110 calculates a precoding matrix and uses that matrix to simultaneously transmit independent data streams to existing user devices and to one or more new user devices.

FIG. 2 is only one embodiment of the central controller 201. In other embodiments, the central controller 201 may control a different number of RHs. Further, the RHs may include different numbers of antennas than shown.

Figure 3:
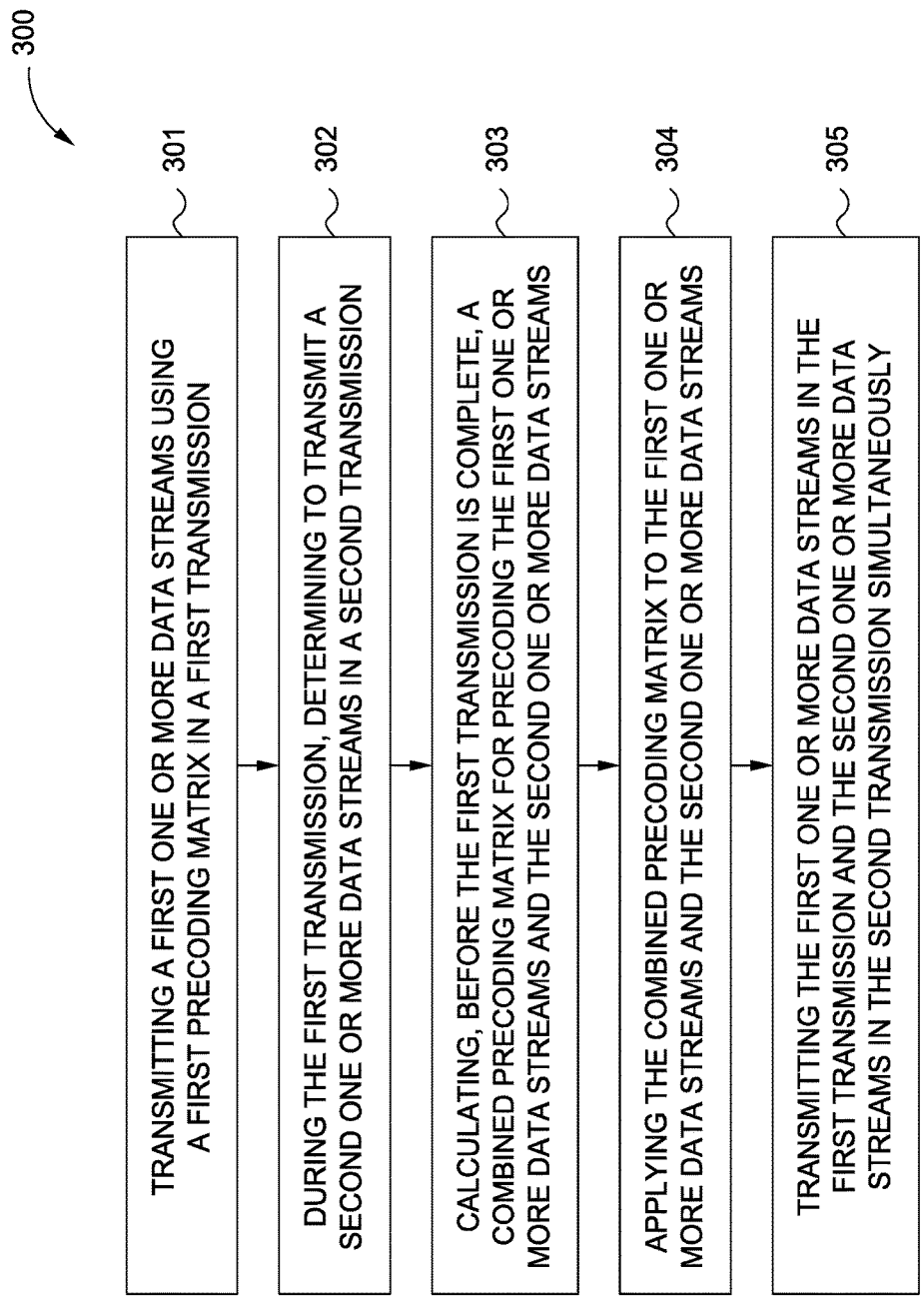
FIG. 3 illustrates a flowchart showing a method to transmit data streams, according to one embodiment herein.

FIG. 3 illustrates a flowchart showing a method 300 to transmit data streams, according to one embodiment herein. In one embodiment, the method 300 is implemented in an MIMO AP, which will be described using FIGS. 4A and 4B below.

Figure 4A:
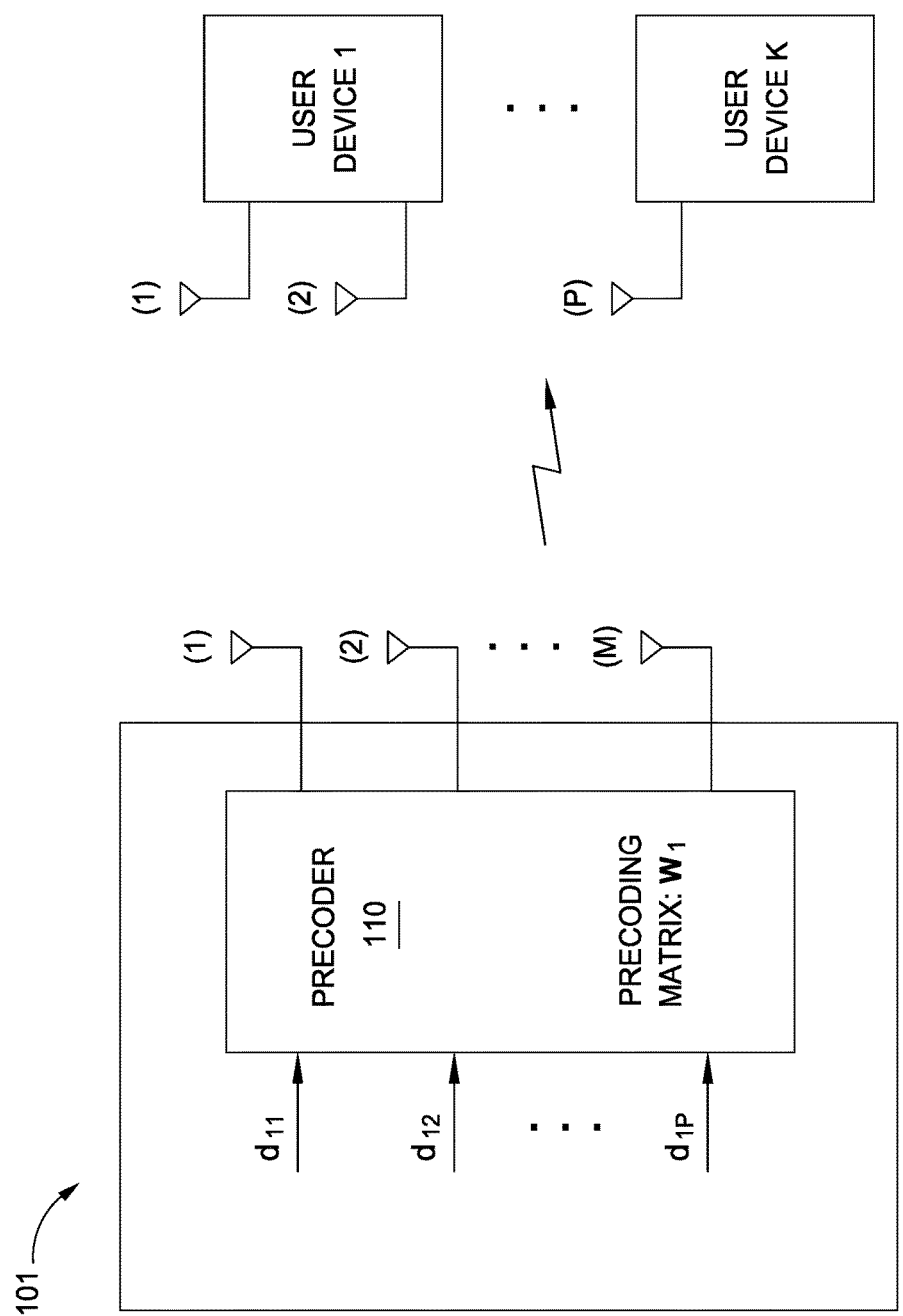
FIG. 4A illustrates an MIMO AP transmitting data streams to existing user devices, according to one embodiment herein.

At block 301, the MIMO AP 101 transmits a first one or more data streams using a first precoding matrix in a first transmission. As shown in FIG. 4A, the MIMO AP 101 includes the precoder 110 that receives P independent data streams, e.g., $d_{11}$, $d_{12}$, ... $d_{1P}$, from the data generation component of the AP 101 (not shown in FIG. 4A), as understood in the art. P can represent one data stream or multiple data streams. In one embodiment, the precoder 110 calculates a first precoding matrix $W_1$ by using Zero-forcing algorithm, as understood in the art. The precoder 110 applies the first precoding matrix $W_1$ to the P independent data streams. For example, the P independent data streams can be expressed as a P×1 vector and the first precoding matrix $W_1$ can be expressed as a M×P matrix. The precoder 110 can perform the precoding by multiplying the M×P precoding matrix $W_1$ with the P×1 vector, as understood in the art.

In one embodiment, the AP 101 transmits the precoded P independent data streams through the M transmit antennas to K user devices in a first transmission. The K user devices may include cell phones, laptops, tablets and other network devices utilizing the network service, as understood in the art.

In one embodiment, the P independent data streams include a finite number of data packets (e.g. one single user (SU) data packet for each of the K user devices; or one standards-based downlink (DL) MU-MIMO data packet for all user devices; or a mixture of SU and MU PHY Layer Convergence Procedure Protocol Data Units (PPDUs)). In one embodiment, the AP 101 knows the total number of data packets that will be sent in the first transmission which the AP can use to allocate power, channels and antennas for transmitting the data packets in the first transmission. At block 301, the AP 101 begins transmitting the data packets in the first transmission to the K user devices. Each user device has one or more receive antennas. For example, as shown in FIG. 4A, user device 1 has two receive antennas and user device K has one receive antenna. In one embodiment, the total number of receive antennas for the K user devices equals to P, as shown in FIG. 4A. In one embodiment, each receive antenna receives one independent data stream with no or minimal interference from signals intended for other user devices. For example, in MU-MIMO, because the precoder 110 performs zero-forcing precoding using the M×P precoding matrix $W_1$, and the precoding matrix is calculated using the channel state information (CSI) from antennas of the user devices to antennas of the AP without any precoding by the user devices, the effective MIMO channel (a P×M matrix) is diagonalized by the precoding matrix $W_1$. Thus, for each receive antenna on a user device, the user device only receives the independent data stream that is intended to be transmitted to that antenna. The interference caused by other independent data streams is mitigated or canceled due to the zero-forcing precoding, as understood in the art. In another embodiment, for user devices with more than one antenna, the CSI from those user devices may include some precoding by the user devices. In another embodiment, the AP may performs block zero forcing (zero forcing between user devices but not between antennas of the same user device), so that each receive antenna of a user device may receive a linear sum of multiple streams for that user device from the AP with no or minimal interference from signals intended for other user devices.

In another embodiment, the total number of receive antennas for the K user devices can be larger than P. Thus, multiple receive antennas can receive one or more independent data streams.

Figure 4B:
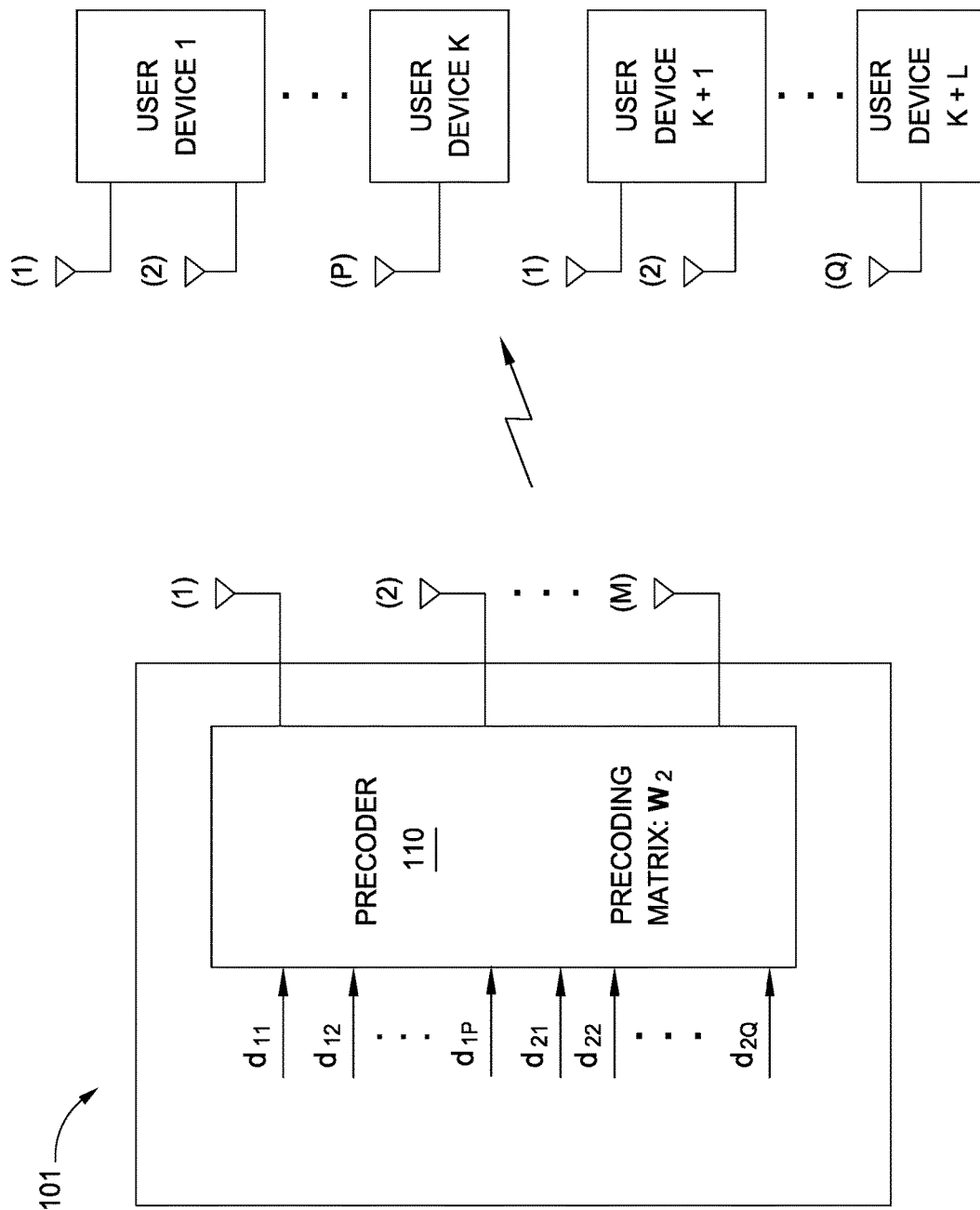
FIG. 4B illustrates the MIMO AP simultaneously transmitting additional data streams to multiple new user devices, according to one embodiment herein.

Blocks 302-305 are described using FIG. 4B. At block 302, during the first transmission, the AP 101 determines to transmit a second one or more data streams in a second transmission. For example, after part (but not all) of the data packets in the first transmission are transmitted to the K user devices, the AP 101 identifies a second transmission intended for L new user device (i.e., user devices different from the K user devices currently receiving data from the AP 101). For example, the user device(s) may request data packets from the AP 101 or the AP 101 may have received data packets for the new user device(s) from another network device. As shown in FIG. 4B, during the first transmission of the P independent data streams to the K user devices, the AP 101 determines to transmit additional Q independent data streams, i.e., $d_{21}, d_{22}, \ldots d_{2Q}$, in a second transmission to the new L user devices (from user device K+1 to user device K+L, as shown in FIG. 4B). Q can represent one data stream or multiple data streams. In one embodiment, the Q independent data streams include a data stream to send a Short Interframe Space (SIFS) control frame. In one embodiment, the Q independent data streams include a finite number of data packets (e.g. one SU data packet for each of the L users; or one standards-based DL-MU-MIMO data packet for all L users; or a mixture of SU and MU PPDUs). In one embodiment, the L new user devices have Q receive antennas, as shown in FIG. 4B. Each of the Q antennas receives one of the Q independent data streams. In another embodiment, the AP 101 determines to transmit additional independent data streams to a single new user device. In another embodiment, the AP 101 determines to transmit additional independent data streams to existing users that have unused receive antennas.

In one embodiment, the AP 101 transmits the P independent data streams to the K user devices in the first transmission with lower transmit power. Thus, the AP 101 has reserved additional power for transmitting the additional Q independent data streams. Using the reserved power, the AP 101 can simultaneously transmit the P independent data streams in the first transmission along with the additional Q independent data streams in the second transmission. In another embodiment, the AP 101 transmits the P independent data streams to the K user devices in the first transmission without using all its transmit antennas. For example, the AP 101 has one or more unused antennas besides the M antennas used for transmitting the P independent data streams. The AP 101 can use the unused antennas together with the M antennas to transmit the P independent data streams and the additional Q independent data streams simultaneously. In one embodiment, the AP 101 transmits the P independent data streams and the additional Q independent data streams simultaneously using both the reserved power and the unused antennas.

As described above, the first precoding matrix $W_1$ is used for transmitting the P independent data streams. However, the first precoding matrix $W_1$ may not be suitable for simultaneously transmitting the P independent data streams and the additional Q independent data streams. Thus, in order to transmit the P independent data streams and the additional Q independent data streams simultaneously without lowering the receiving performance of the existing K user devices and the new user device L, the AP 101 calculates an updated precoding matrix.

At block 303, the AP 101 calculates, before the first transmission of the P independent data streams is complete, a combined precoding matrix for precoding the first one or more data streams and the second one or more data streams. As shown in FIG. 4B, the AP 101 calculates a combined precoding matrix $W_2$ that precodes both the P independent data streams and the additional Q independent data streams. Calculation of the combined precoding matrix $W_2$ will be described in detail below.

At block 304, the AP 101 applies the combined precoding matrix to the first one or more data streams and the second one or more data streams. In the embodiment as shown in FIG. 4B, the AP 101 applies the combined precoding matrix $W_2$ to precode both the P independent data streams and the additional Q independent data streams simultaneously. In one embodiment, because part (but not all) of the number of data packets in the first transmission are already transmitted to the K user devices using the first precoding matrix $W_1$, the AP 101 applies the combined precoding matrix $W_2$ to precode the remaining data packets in the first transmission and the data packets in the second transmission.

At block 305, the AP 101 transmits the first one or more data streams in the first transmission and the second one or more data streams in the second transmission simultaneously. In the embodiment as shown in FIG. 4B, the AP 101 transmits the P independent data streams to the K user devices and the additional Q independent data streams to the L new user devices simultaneously. The transmitted P independent data streams and the additional Q independent data streams are precoded by the combined precoding matrix $W_2$, as explained above.

In another embodiment, the method 300 is implemented in a central controller and multiple RHs, which will be described using FIGS. 5A and 5B below. Using the method 300 in a central controller and multiple RHs is similar as using the method 300 in an MIMO AP as described above.

Figure 5A:
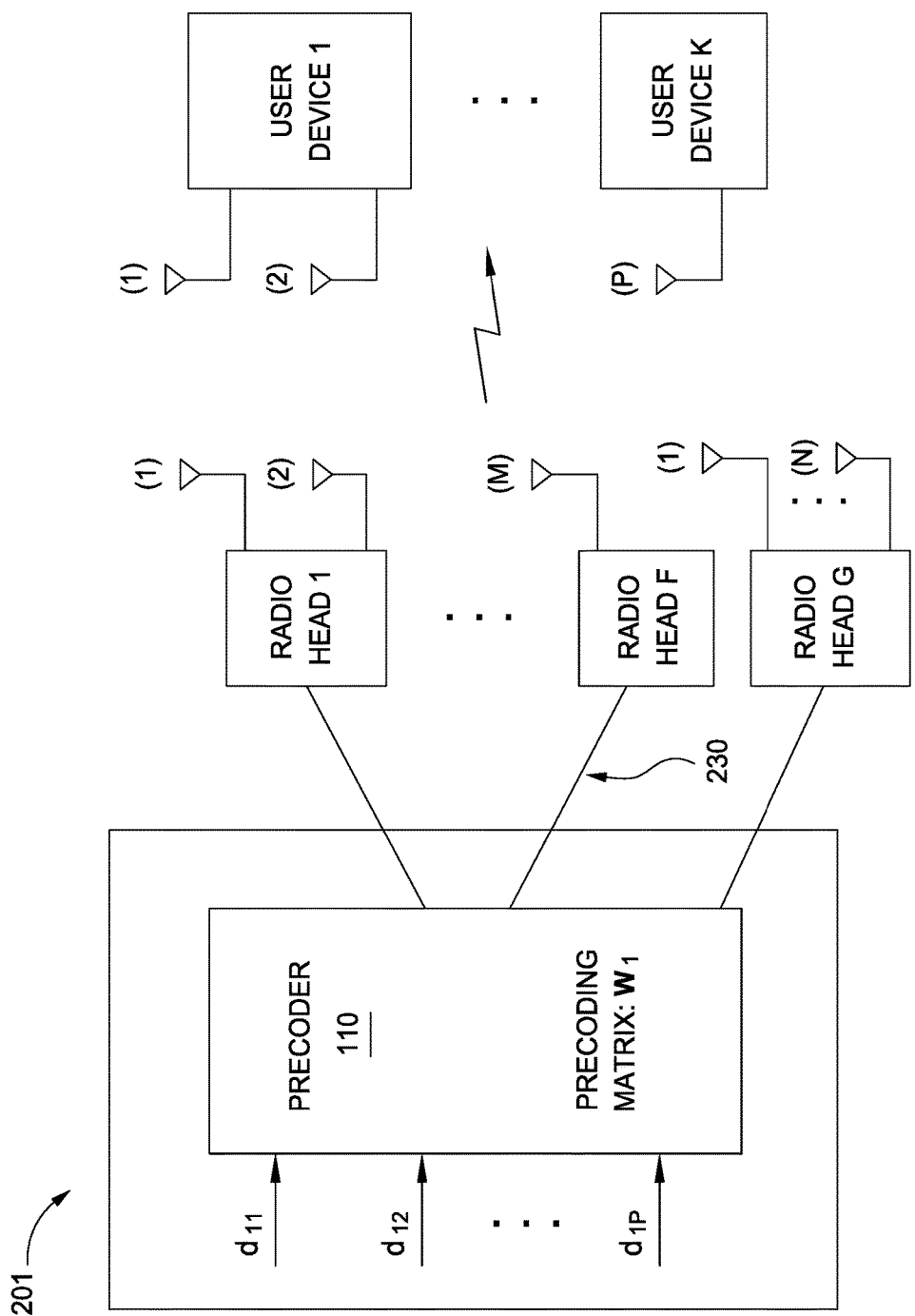
FIG. 5A illustrates a central controller transmitting data streams through multiple radio heads to existing user devices, according to another embodiment herein.

The block 301 is described using FIG. 5A. At block 301, the central controller 201 transmits a first one or more data streams using a first precoding matrix in a first transmission through multiple RHs. As shown in FIG. 5A, the central controller 201 includes the precoder 110 that receives P independent data streams, e.g., $d_{11}, d_{12}, \ldots d_{1P}$. The precoder 110 calculates and applies a first precoding matrix $W_1$ to the baseband signals of the P independent data streams. The central controller 201 sends the baseband signals of the precoded P independent data streams to F RHs, i.e., RH 1 to RH F, through the wired connections 230. Each of the F RHs includes one or more transmit antennas. In FIG. 5A, RH 1 has two transmit antennas and RH F has one transmit antenna. In one embodiment, the total number of transmit antennas of the F RHs is M. At block 301, the F RHs transmit the precoded P independent data streams as RF signals to the K user devices through the M antennas of the F RHs.

Figure 5B:
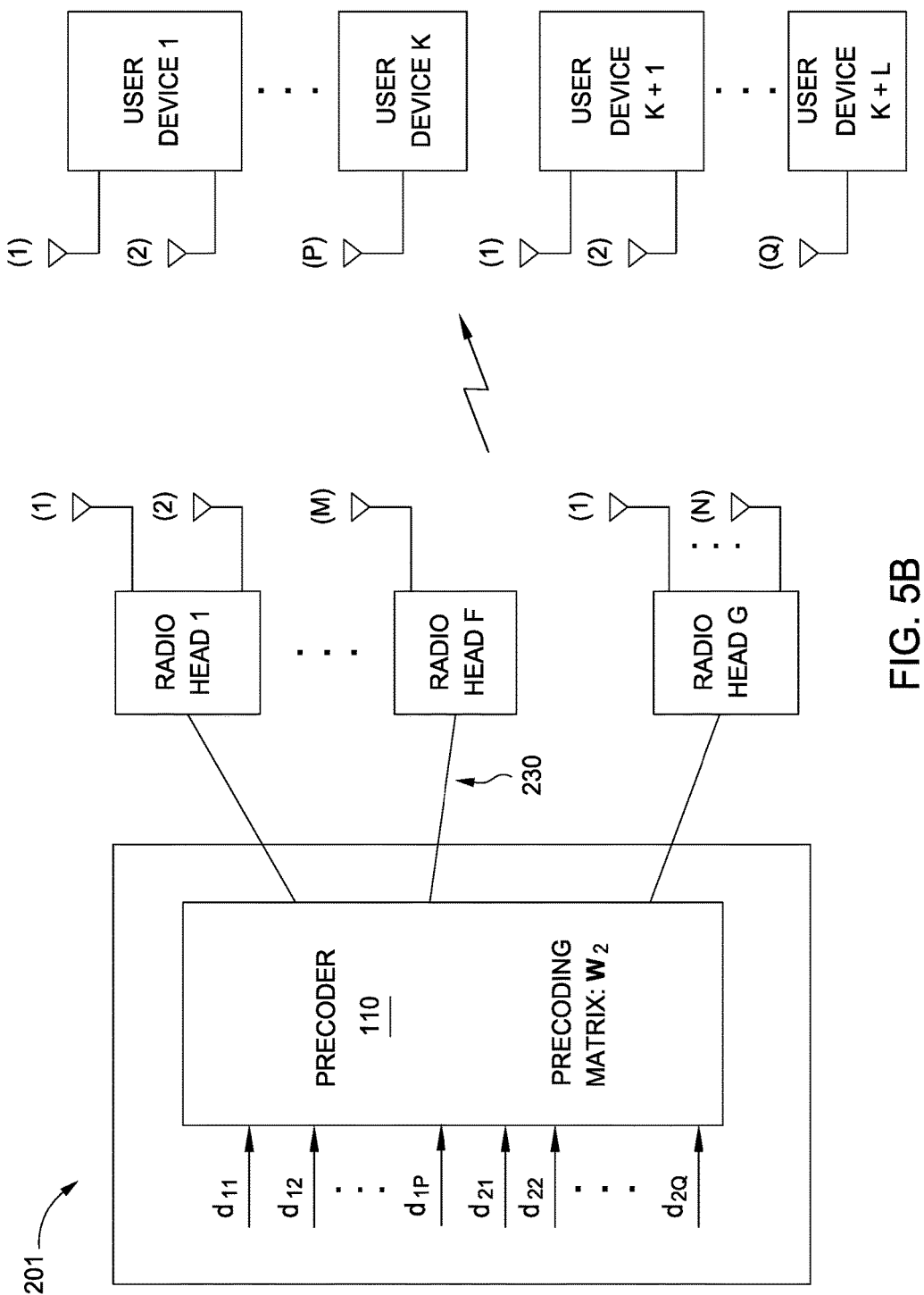
FIG. 5B illustrates the central controller simultaneously transmitting additional data streams through multiple radio heads to multiple new user devices, according to one embodiment herein.

Blocks 302-305 are described using FIG. 5B. At block 302, during the first transmission of the P independent data streams to the K user devices, the central controller 201 determines to transmit additional Q independent data streams, i.e., $d_{21}$, $d_{22}$, ... $d_{2Q}$, in a second transmission to the L new user devices (i.e., user devices different from the K user devices receiving the P independent data streams). The L new user devices are denoted as user device K+1 to user device K+L, as shown in FIG. 5B. In one embodiment, the L new user devices have Q receive antennas, as shown in FIG. 5B.

Similarly as described above, in one embodiment, the central controller 201 controls the F RHs to transmit the P independent data streams to the K user devices in the first transmission with lower transmit power. Thus, the F RHs have reserved power which can be used to transmit the additional Q independent data streams. The central controller 201 instructs the F RHs to transmit the P independent data streams in the first transmission and the additional Q independent data streams in the second transmission simultaneously using the reserved power. In another embodiment, not all the antennas of the F RHs are used to transmit the P independent data streams to the K user devices in the first transmission. For example, one or more of the F RHs may have unused transmit antennas besides the M antennas used for transmitting the P independent data streams. Because the F RHs have available unused antennas, the central controller 201 instructs the F RHs to transmit the P independent data streams and the additional Q independent data streams simultaneously using the unused antennas together with the M antennas.

In another embodiment, not all the RHs controlled by the central controller 201 are used to transmit the P independent data streams to the K user devices in the first transmission. For example, as shown in FIG. 5A, the central controller 201 also controls a RH G which is available for transmitting signals and has one or more transmit antennas, e.g., N transmit antennas. Because the RH G is available, the central controller 201 can cause the RH G together with the F RHs to transmit the P independent data streams and the additional Q independent data streams simultaneously, as shown in FIG. 5B.

In another embodiment, the central controller 201 determines to transmit the P independent data streams and the additional Q independent data streams simultaneously using the reserved power, the unused antennas and/or the unused RHs.

At block 303, the central controller 201 calculates a combined precoding matrix $W_2$ that precodes both the P independent data streams and the additional Q independent data streams simultaneously.

At block 304, the central controller 201 applies the combined precoding matrix $W_2$ to precode both the P independent data streams and the additional Q independent data streams simultaneously. At block 305, the central controller sends the baseband signals of the precoded P independent data streams and the additional Q independent data streams to the RHs through the wired connections 230. As shown in FIG. 5B, at block 305, the RH G together with the F RHs transmit the precoded P independent data streams and the additional Q independent data streams simultaneously as RF signals to the K user devices and the L new user devices through the M+N antennas of the RHs.

Several different techniques can be used to calculate the combined precoding matrix $W_2$ at block 303. In one embodiment, the combined precoding matrix $W_2$ is calculated per subchannel or subcarrier, e.g., per Orthogonal Frequency Division Multiplexing (OFDM) subcarrier. Thus, for simplicity of illustration, the subcarrier index is omitted below. In the embodiments below, it is assumed that the total number of receive antennas for the user devices equals to the total number of transmitted data streams.

In one embodiment, the precoder 110 calculates the combined precoding matrix $W_2$ using Schur complement. It is denoted that $H_A$ is the P×M channel (estimate) matrix for the P streams transmitted from the M transmit antennas to the P receive antennas. Similarly, $H_B$ is the Q×M channel (estimate) matrix for the Q additional streams transmitted from the M transmit antennas to the Q receive antennas. It is assumed that (P+Q)≤M. In one embodiment, the precoder 110 knows the $H_A$ and the $H_B$ through transmitter side channel estimation.

By using the zero-forcing algorithm, the first precoding matrix $W_1$ (an M×P matrix) is:

$$W_1 = H_A^H (H_A H_A^H)^{-1} \quad (1)$$

By using the zero-forcing algorithm, the combined precoding matrix $W_2$ (an M×(P+Q) matrix) is:

$$W_2 = [H_A^H \; H_B^H] \begin{bmatrix} H_A H_A^H & H_A H_B^H \\ H_B H_A^H & H_B H_B^H \end{bmatrix}^{-1} \quad (2)$$

$W_2$ can be expressed as:

$$W_2 = [H_A^H \; H_B^H] R^{-1}, \text{ in which } R = \begin{bmatrix} H_A H_A^H & H_A H_B^H \\ H_B H_A^H & H_B H_B^H \end{bmatrix} \quad (3)$$

$R^{-1}$ can be expressed as:

$$R^{-1} = \begin{bmatrix} E & F \\ F^H & G \end{bmatrix}, E = E^H, G = G^H \quad (4)$$

By using Schur complement, E, F and G can be expressed as:

$$E = (H_A H_A^H)^{-1} + (H_B W_1)^H G (H_B W_1) \quad (5)$$

$$F = -(H_A H_A^H)^{-1} H_A H_B^H G - (H_B W_1)^H G \quad (6)$$

$$G = (H_B H_B^H - H_B H_A^H (H_A H_A^H)^{-1} H_A H_B^H)^{-1} = (H_B (I - W_1 H_A) H_B^H)^{-1} \quad (7)$$

$W_2$ can be expressed as:

$$W_2 = [H_A^H \; H_B^H] R^{-1} = [H_A^H \; H_B^H] \begin{bmatrix} E & F \\ F^H & G \end{bmatrix} = \\ [H_A^H E + H_B^H F^H \;\; H_A^H F + H_B^H G] \quad (8)$$

Based on equations (5)-(7), $H_A^H E + H_B^H F^H$ can be calculated as:

$$H_A^H E + H_B^H F^H = \quad (9)$$

$$H_A^H(H_A H_A^H)^{-1} + H_A^H(H_B W_1)^H G(H_B W_1) - H_B^H G(H_B W_1) =$$

$$W_1 - (H_B P_A^\perp)^H G(H_B W_1),$$

in which $P_A^\perp = (I - W_1 H_A)$

Based on equations (5)-(7), $H_A^H F + H_B^H G$ can be calculated as:

$$H_A^H F + H_B^H G = -H_A^H (H_B W_1)^H G + H_B^H G = (I - (W_1 H_A)^H) H_B^H G = (H_B P_A^\perp)^H G \quad (10)$$

Therefore, given the already calculated $W_1$, the precoder 110 can calculate $H_A^H E + H_B^H F^H$ and $H_A^H F + H_B^H G$ using $W_1$ to obtain $W_2$. By using the calculated $W_2$ to precode both the P data streams and the additional Q data streams, the overall channels and channel gains to the existing K user devices are not changed. That is, by using the calculated $W_2$ to precode both the P data streams and the additional Q data streams, the receiving performance of the existing K user devices is not affected.

In another embodiment, the precoder 110 can calculate $W_2$ using $W_1$ when additional N antennas are used to transmit the additional Q independent data streams. This embodiment has two steps. The first step is to calculate an intermediate $W_2$ for transmitting the P data streams using M+N antennas based on the Woodbury matrix identity, which is described in detail below.

It is denoted that $H_1$ is the P×M channel (estimate) matrix for the P streams transmitted from the M transmit antennas to the P receive antennas. Similarly, $H_2$ is the P×N channel (estimate) matrix for the P streams transmitted from the N additional transmit antennas to the P receive antennas. In one embodiment, the precoder 110 knows the $H_1$ and the $H_2$ through transmitter side channel estimation.

Similarly as above, by using the zero-forcing algorithm, the first precoding matrix $W_1$ (an M×P matrix) is $W_1 = H_1^H (H_1 H_1^H)^{-1}$ and the intermediate $W_2$ (an (M+N)×P matrix) is $$W_2 = \begin{bmatrix} H_1^H \\ H_2^H \end{bmatrix} (H_1 H_1^H + H_2 H_2^H)^{-1}.$$

It is denoted that $X_{1,2} = H_2^H (H_1 H_1^H)^{-1}$. By using Woodbury matrix identity, $(H_1 H_1^H + H_2 H_2^H)^{-1}$ can be expressed as:

$$(H_1 H_1^H + H_2 H_2^H)^{-1} = (H_1 H_1^H)^{-1} (I - H_2 (I + X_{1,2} H_2)^{-1} X_{1,2}) \quad (11)$$

Based on equation (11), $H_1^H (H_1 H_1^H + H_2 H_2^H)^{-1}$ can be expressed as:

$$H_1^H (H_1 H_1^H + H_2 H_2^H)^{-1} = H_1^H (H_1 H_1^H)^{-1} (I - H_2 (I + X_{1,2} H_2)^{-1} X_{1,2}) \quad (12)$$
$$= W_1 (I - H_2 (I + X_{1,2} H_2)^{-1} X_{1,2})$$

Based on equation (11), $H_2^H (H_1 H_1^H + H_2 H_2^H)^{-1}$ can be expressed as:

$$H_2^H (H_1 H_1^H + H_2 H_2^H)^{-1} = X_{1,2} (I - H_2 (I + X_{1,2} H_2)^{-1} X_{1,2}) \quad (13)$$

Therefore, given the already calculated $W_1$, the precoder 110 can calculate $H_1^H (H_1 H_1^H + H_2 H_2^H)^{-1}$ and $H_2^H (H_1 H_1^H + H_2 H_2^H)^{-1}$ using $W_1$ to obtain the intermediate $W_2$ for transmitting the P data streams using M+N antennas. After calculating the intermediate $W_2$, the second step of this embodiment is to calculate the final $W_2$ based on the intermediate $W_2$. In the second step, the precoder 110 calculates the final $W_2$ for transmitting the P+Q data streams using M+N antennas based on Schur complement as described above. Details of the second step are omitted here.

In another embodiment, the precoder 110 calculates the combined precoding matrix $W_2$ using QR decomposition. In one embodiment, the precoder 110 calculates the combined precoding matrix $W_2$ using QR decomposition to transmit Q additional data streams using M antennas. Similarly as above, by using the zero-forcing algorithm, the first precoding matrix $W_1$ (an M×P matrix) is $W_1 = H_1^H (H_1 H_1^H)^{-1}$.

By using QR decomposition to $H_1$, $$H_1^H = Q \begin{bmatrix} R \\ 0 \end{bmatrix},$$

where Q is a M×M unitary matrix and R is a P×P upper triangular matrix with non-zero diagonal elements.

Q can be expressed as $Q = [Q_1, Q_2]$ and $W_1$ can be expressed as:

$$W_1 = H_1^H (H_1 H_1^H)^{-1} = Q_1 R (R^H Q_1^H Q_1 R)^{-1} = Q_1 R (R^H R)^{-1} = Q_1 R^{-H} \quad (14)$$

where $Q_1$ is the first P columns of a M×M unitary matrix (a M×P matrix).

If Q equals to one, i.e., one additional data stream is transmitted simultaneously with the P existing data streams, the new channel matrix is:

$$H_{new}^H = [H_1^H, x^H] \quad (15)$$

where x is a 1×M vector representing the channel coefficients for the additional data stream.

Equation (15) can be modified as:

$$Q^H H_{new}^H = [Q^H H^H, Q^H x^H] = \begin{bmatrix} \begin{bmatrix} R \\ 0 \end{bmatrix}, \begin{bmatrix} y \\ z \end{bmatrix} \end{bmatrix} \quad (16)$$

Therefore, the precoder 110 calculates y (a P dimensional column vector), and z (a (M−P) dimensional column vector) given Q from the QR decomposition of the initial channel matrix $H_1$.

To make the result upper triangular, in one embodiment, Equation 16 is multiplied from the left with another unitary matrix to zero all but the first entry of z. This can be performed by a single Householder reflection and does not affect the other components of the result as below:

$$\begin{bmatrix} I_P & 0 \\ 0 & U_{M-P} \end{bmatrix} Q^H H_{new}^H = \begin{bmatrix} \begin{bmatrix} R \\ 0 \end{bmatrix}, \begin{bmatrix} y \\ U_{M-P} z \end{bmatrix} \end{bmatrix} \quad (17)$$

The Householder reflection matrix $U_{M-P}$ can be designed such that only the first component of the result of the operation $U_{M-P} z$ is non-zero. Since the multiplication does not change the Euclidean norm of a vector, the non-zero component has a magnitude that equals the Euclidean norm of z.

Therefore, the QR decomposition of the augmented channel matrix $H_{new}^H$ with Hermitian transpose can be expressed as:

$$Q_{new} = Q \begin{bmatrix} I_P & 0 \\ 0 & U_{M-P}^H \end{bmatrix} = [Q_1, Q_2 U_{M-P}^H]$$

After the QR decomposition of $H_{new}^H$ is computed, $W_2$ can be computed based on the QR decomposition of $H_{new}^H$, as understood in the art.

In another embodiment, the precoder 110 calculates the combined precoding matrix $W_2$ using the thin-QR decomposition. By using the thin-QR decomposition, $H_1^H = Q_1 R$, where $Q_2$ is omitted.

The projection matrix that spans the complement of the column-space of $H_1^H$ can be computed as $(I - Q_1 Q_1^H)$.

The following is the component of the new destination channel response $x^H$ (in $H_{new}^H = [H_1^H, x^H]$) that is orthogonal to the columns of $H_1^H$:

$$v = (I - Q_1 Q_1^H) x^H \quad (18)$$

By Gram-Schmidt arguments, the thin QR decomposition for the augmented channel $H_{new}^H$ has a updated matrix with (P+1) orthonormal columns, which can be expressed as $[Q_1, v/\|v\|]$.

By using $[Q_1, v/\|v\|]$ together with the new upper triangular matrix, the precoder 110 calculates the following:

$$[Q_1, v/\|v\|]^H H_{new}^H = \begin{bmatrix} R & Q_1^H x^H \\ 0 & \|v\| \end{bmatrix} \quad (19)$$

The precoder 110 calculates $W_2$ as:

$$W_2 = H_{new}^H (H_{new} H_{new}^H)^{-1} = [Q_1, v/\|v\|] \begin{bmatrix} R & Q_1^H x^H \\ 0 & \|v\| \end{bmatrix}^{-H} \quad (20)$$

The above method can be generalized for computing the QR decomposition of the augmented channel when more than one stream is added by the same principles: projecting the additional channels onto the orthogonal complement of $Q_1$, and computing a thin-QR of the residual channels by Householder reflection and combine the QR results.

The following is the component of the new destination channel responses matrix $X^H$ (in $H_{new}^H = [H_1^H, X^H]$) that is orthogonal to the columns of $H_1^H$:

$$V = (I - Q_1 Q_1^H) X^H \quad (21)$$

where $X^H$ represent the channel matrix for the Q additional data streams.

The thin-QR decomposition for the residual channel V can be expressed as $V = Q_2 R_2$. It is denoted that $Q = [Q_1, Q_2]$, the following is obtained by multiplying the new composite channel Hermitian transpose $(H_{new}^H = [H_1^H, X^H])$ from the left with $Q^H$:

$$Q^H H_{new}^H = \begin{bmatrix} Q_1^H \\ Q_2^H \end{bmatrix} [H_1^H, X^H] = \begin{bmatrix} R & Q_1^H X^H \\ 0 & R_2 \end{bmatrix} \quad (22)$$

Based on equation (22), the precoder 110 can calculate the QR decomposition of $H_{new}^H$. Based on the QR decomposition of $H_{new}^H$, the precoder 110 can calculate $W_2$ as:

$$W_2 = [Q_1, Q_2] \begin{bmatrix} R & Q_1^H X^H \\ 0 & R_2 \end{bmatrix}^{-H} = [Q_1, Q_2] \begin{bmatrix} R^H & 0 \\ X Q_1 & R_2^H \end{bmatrix}^{-1} \quad (23)$$

In one embodiment, the precoder 110 can calculate $W_2$ using QR decomposition when additional N antennas are used to transmit the additional Q independent data streams. Similarly as described above, this embodiment has two steps. The first step is to calculate an intermediate $W_2$ for transmitting the P data streams using M+N antennas, which is described in details below.

If N equals to one, i.e., one additional antenna is used to the P existing data streams, the new channel matrix is:

$$H_{new}^H = \begin{bmatrix} x^H \\ H_1^H \end{bmatrix} \quad (24)$$

where x is a P×1 vector representing the channel response from the new antenna to all destinations.

Using the QR decomposition of $H_1^H$ ($H_1^H = QR$), the following is obtained by multiplying the $H_{new}^H$ from the left with a matrix including $Q^H$:

$$\begin{bmatrix} 1 & 0 \\ 0 & Q^H \end{bmatrix} H_{new}^H = \begin{bmatrix} 1 & 0 \\ 0 & Q^H \end{bmatrix} \begin{bmatrix} x^H \\ H^H \end{bmatrix} = \begin{bmatrix} x^H \\ R \end{bmatrix} \quad (25)$$

Based on equation (25), the precoder 110 can calculate the QR decomposition of $H_{new}^H$. Based on the QR decomposition of $H_{new}^H$, the precoder 110 can calculate the intermediate $W_2$ similarly as described above.

The above method can be generalized for computing the QR decomposition of the augmented channel when more than one antenna is added. After calculating the intermediate $W_2$, the second step of this embodiment is to calculate the final $W_2$ based on the intermediate $W_2$. In the second step, the precoder 110 calculates the final $W_2$ for transmitting the P+Q data streams using M+N antennas based on Schur complement as described above. Details of the second step are omitted here.

In another embodiment, the precoder 110 can use the QR decomposition to first calculate the precoding matrix for transmitting P+Q data streams with M antennas, and then calculate the precoding matrix for transmitting P+Q data streams with M+N antennas.

The above embodiments describe that the precoder 110 calculates the updated precoding matrix $W_2$ for each subcarrier or subchannel. In one embodiment, the precoder 110 can calculate the precoding matrix $W_2$ for every K-th subcarrier and propagate the precoding matrix $W_2$ for the nearby subcarriers. For example, the precoder 110 can calculate the precoding matrix $W_2$ for every 8 subcarriers. Once the precoding matrices $W_2$ for the subset of the subcarriers are calculated, the precoder 110 uses the calculated precoding matrix $W_2$ to calculate the precoding matrix $W_2$ in one or more neighboring subcarriers. For examples, the precoding matrix $W_2$ of the first subcarrier is used to calculate the precoding matrix $W_2$ of the second subcarrier, the precoding matrix $W_2$ of the eighth subcarrier is used to calculate the precoding matrices $W_2$ of the seventh and ninth subcarriers, the precoding matrix $W_2$ of the sixteenth subcarrier is used to calculate the precoding matrices $W_2$ of the fifteenth and seventeenth subcarriers, and so forth.

Figure 6:
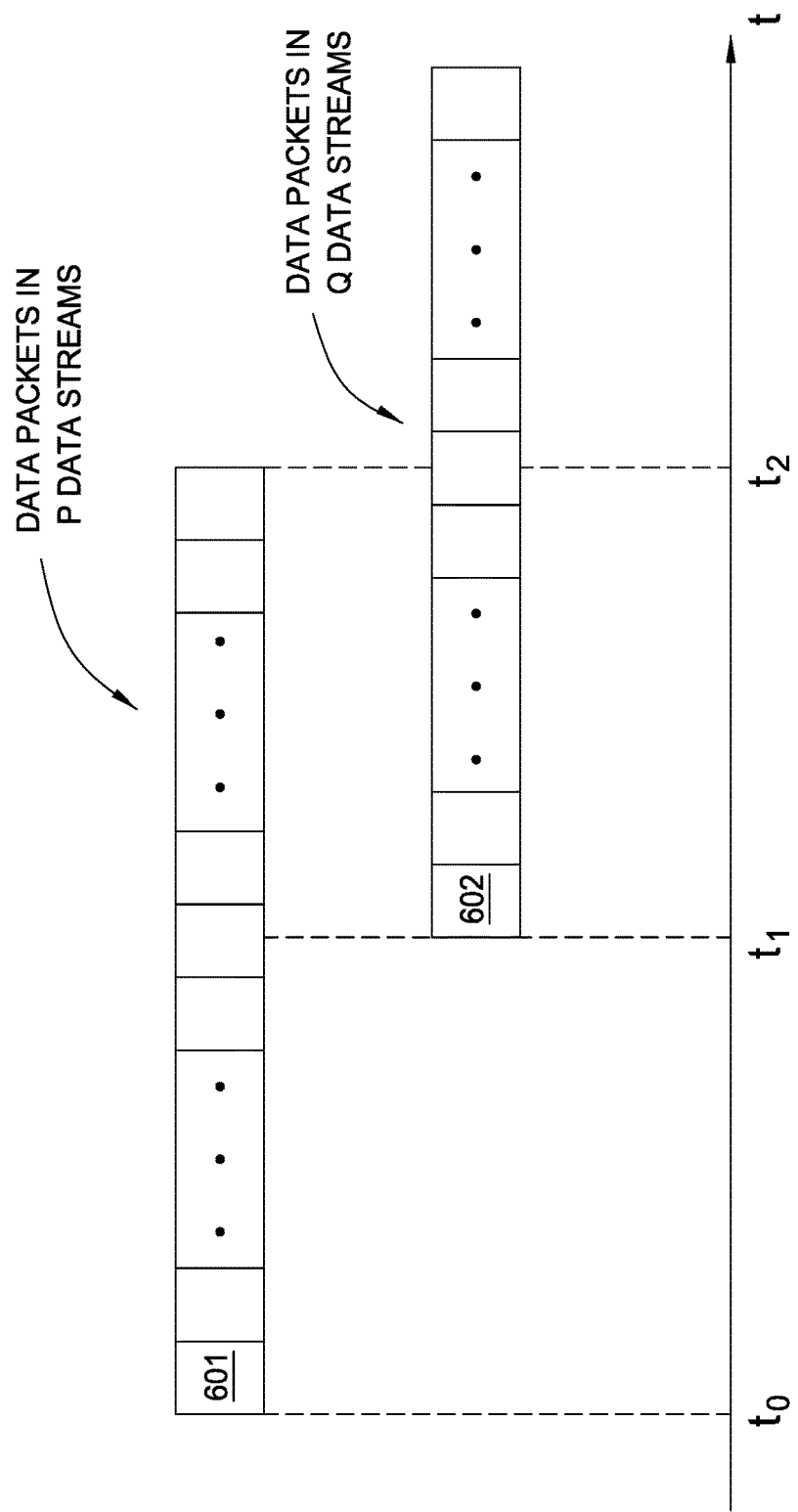
FIG. 6 illustrates the simultaneous transmission of data streams to existing user devices and additional data streams to new user devices, according to one embodiment herein.

FIG. 6 illustrates the simultaneous transmission of P data streams to existing user devices (e.g., the K user devices as described above) and Q additional data streams to new user devices (e.g., the L user devices as described above), according to one embodiment herein. As shown in FIG. 6, from the beginning of the transmission of the P data streams, i.e., time $t_0$ to time $t_1$, the device (e.g., the MIMO AP 101 or the central controller 201 controlling the multiple RHs as described above) transmits the data packets 601 in the P data streams using the precoding matrix $W_1$. From time $t_1$ to time $t_2$, the device continues to transmit the data packets 601 in the P data streams and additionally transmits the data packets 602 in the Q additional data streams simultaneously using the precoding matrix $W_2$. That is, the precoder 101 precodes the P data streams and the Q data streams using the precoding matrix $W_2$ for the simultaneous transmission between time $t_1$ and time $t_2$. In one embodiment, after time $t_2$, the P data streams are already transmitted and the device may transmit the remaining data packets 602 in the Q data streams by calculating and applying a new precoding matrix for the remaining data packets 602 in the Q data streams, as understood in the art.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A device, comprising:
a processor;
a precoder for precoding data streams and configured to:
during a first transmission of a first one or more data streams comprising a known number of data packets, where the first one or more data streams are precoded using a first precoding matrix, wherein the first transmission comprises one or more transmission channels and one or more channel gains for one or more user devices connected in the first transmission, determine to transmit a second one or more data streams in a second transmission;
calculate, before the first transmission of the known number of data packets is complete, a combined precoding matrix for precoding the first one or more data streams and the second one or more data streams, wherein each element of the combined precoding matrix is calculated based on a channel matrix in the first precoding matrix and an a estimated matrix for the second transmission, wherein the channel matrix represents the one or more transmission channels and the one or more channel gains for the one or more user devices connected in the first transmission; and
transmit the first one or more data streams in the first transmission and the second one or more data streams in the second transmission simultaneously by applying the combined precoding matrix, wherein the one or more transmission channels and the one or more channel gains for the one or more user devices connected in the first transmission are maintained during the simultaneous transmission of the first one or more data streams and the second one or more data streams.

2. The device of claim 1, wherein the device comprises a multiple-input and multiple-output (MIMO) access point.

3. The device of claim 1, wherein the device comprises a central controller controlling a plurality radio heads.

4. The device of claim 1,
wherein the first transmission using the first precoding matrix is from a first number of transmit antennas; and
wherein the simultaneous transmission of the first transmission and the second transmission using the combined precoding matrix is from a second number of transmit antennas greater than the first number of transmit antennas.

5. The device of claim 1,
wherein the first transmission using the first precoding matrix uses a first amount of transmit power; and
wherein the simultaneous transmission of the first transmission and the second transmission using the combined precoding matrix uses a second amount of transmit power greater than the first amount of transmit power.

6. The device of claim 1, wherein the precoder is further configured to:
calculate the combined precoding matrix based on the first precoding matrix.

7. The device of claim 1, wherein the second one or more data streams in the second transmission comprises a data stream configured to send a Short Interframe Space (SIFS) control frame.

8. A computer program product, comprising:
a non-transitory computer-readable storage medium having computer-readable program code embodied therewith, wherein the computer-readable program code is configured to:
during a first transmission of a first one or more data streams comprising a known number of data packets, where the first one or more data streams are precoded using a first precoding matrix, wherein the first transmission comprises one or more transmission channels and one or more channel gains for one or more user devices connected in the first transmission, determine to transmit a second one or more data streams in a second transmission;

calculate, before the first transmission of the known number of data packets is complete, a combined precoding matrix for precoding the first one or more data streams and the second one or more data streams, wherein each element of the combined precoding matrix is calculated based on a channel matrix in the first precoding matrix and an a estimated matrix for the second transmission, wherein the channel matrix represents the one or more transmission channels and the one or more channel gains for the one or more user devices connected in the first transmission; and transmit the first one or more data streams in the first transmission and the second one or more data streams in the second transmission simultaneously by applying the combined precoding matrix, wherein the one or more transmission channels and the one or more channel gains for the one or more user devices connected in the first transmission are maintained during the simultaneous transmission of the first one or more data streams and the second one or more data streams.

9. The computer program product of claim 8, wherein the computer-readable program code is stored in a multiple-input and multiple-output (MIMO) access point and configured to cause the MIMO access point to transmit the first one or more data streams in the first transmission and the second one or more data streams in the second transmission simultaneously by applying the combined precoding matrix.

10. The computer program product of claim 8, wherein the computer-readable program code is stored in a central controller controlling a plurality of radio heads and configured to cause the central controller to control the plurality of radio heads to transmit the first one or more data streams in the first transmission and the second one or more data streams in the second transmission simultaneously by applying the combined precoding matrix.

11. The computer program product of claim 8,
wherein the first transmission using the first precoding matrix is from a first number of transmit antennas; and
wherein the simultaneous transmission of the first transmission and the second transmission using the combined precoding matrix is from a second number of transmit antennas greater than the first number of transmit antennas.

12. The computer program product of claim 8,
wherein the first transmission using the first precoding matrix uses a first amount of transmit power; and
wherein the simultaneous transmission of the first transmission and the second transmission using the combined precoding matrix uses a second amount of transmit power greater than the first amount of transmit power.

13. The computer program product of claim 8, wherein the computer-readable program code is further configured to calculate the combined precoding matrix based on the first precoding matrix.

14. The computer program product of claim 8, wherein the second one or more data streams in the second transmission comprises a data stream configured to send a Short Interframe Space (SIFS) control frame.

15. A method implemented by a device, comprising:
during a first transmission of a first one or more data streams comprising a known number of data packets, where the first one or more data streams are precoded using a first precoding matrix, wherein the first transmission comprises a one or more transmission channels and one or more channel gains for one or more user devices connected in the first transmission, determining to transmit a second one or more data streams in a second transmission;

calculating, before the first transmission of the known number of data packets is complete, a combined precoding matrix for precoding the first one or more data streams and the second one or more data streams, wherein each element of the combined precoding matrix is calculated based on a channel matrix in the first precoding matrix and an a estimated matrix for the second transmission, wherein the channel matrix represents the one or more transmission channels and the one or more channel gains for the one or more user devices connected in the first transmission; and transmitting the first one or more data streams in the first transmission and the second one or more data streams in the second transmission simultaneously by applying the combined precoding matrix, wherein the one or more transmission channels and the one or more channel gains for the one or more user devices connected in the first transmission are maintained during the simultaneous transmission of the first one or more data streams and the second one or more data streams.

16. The method of claim 15, wherein the device comprises a multiple-input and multiple-output (MIMO) access point or a central controller controlling a plurality radio heads.

17. The method of claim 15,
wherein the first transmission using the first precoding matrix is from a first number of transmit antennas; and
wherein the simultaneous transmission of the first transmission and the second transmission using the combined precoding matrix is from a second number of transmit antennas greater than the first number of transmit antennas.

18. The method of claim 15,
wherein the first transmission using the first precoding matrix uses a first amount of transmit power; and
wherein the simultaneous transmission of the first transmission and the second transmission using the combined precoding matrix uses a second amount of transmit power greater than the first amount of transmit power.

19. The method of claim 15, wherein calculating the combined precoding matrix comprises calculating the combined precoding matrix based on the first precoding matrix.

20. The method of claim 15, wherein the second one or more data streams in the second transmission comprises a data stream configured to send a Short Interframe Space (SIFS) control frame.

* * * * *

UNITED STATES PATENT AND TRADEMARK OFFICE
CERTIFICATE OF CORRECTION

PATENT NO. : 10,367,550 B2
APPLICATION NO. : 15/477620
DATED : July 30, 2019
INVENTOR(S) : David S. Kloper et al.

It is certified that error appears in the above-identified patent and that said Letters Patent is hereby corrected as shown below:

In the Claims

In Column 16, Line 9, in Claim 1, delete "an a" and insert -- an --, therefor.

In Column 16, Line 29, in Claim 3, after "plurality" insert -- of --.

In Column 17, Line 7, in Claim 8, delete "an a" and insert -- an --, therefor.

In Column 18, Line 19, in Claim 15, delete "an a" and insert -- an --, therefor.

In Column 18, Line 35, in Claim 16, after "plurality" insert -- of --.

Signed and Sealed this
First Day of October, 2019

Andrei Iancu
*Director of the United States Patent and Trademark Office*